United States Patent
Karunakaran et al.

(10) Patent No.: US 8,478,854 B2
(45) Date of Patent: Jul. 2, 2013

(54) TOLERANT DEVICE LICENSING IN A DISTRIBUTED ENVIRONMENT

(75) Inventors: Kumara Das Karunakaran, San Jose, CA (US); Vivek L. Atreya, Bangalore (IN); Shashi H. Ankaiah, Karnataka (IN); Seemant Choudhary, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 216 days.

(21) Appl. No.: 12/775,031

(22) Filed: May 6, 2010

(65) Prior Publication Data
US 2010/0293272 A1 Nov. 18, 2010

Related U.S. Application Data

(60) Provisional application No. 61/178,300, filed on May 14, 2009.

(51) Int. Cl.
*G06F 15/173* (2006.01)
(52) U.S. Cl.
USPC ............ 709/223; 709/224; 709/225; 709/226
(58) Field of Classification Search
USPC ................................................. 709/223–226
See application file for complete search history.

(56) References Cited

U.S. PATENT DOCUMENTS

| | | | | |
|---|---|---|---|---|
| 6,427,170 B1 * | 7/2002 | Sitaraman et al. | ............ | 709/226 |
| 6,578,074 B1 * | 6/2003 | Bahlmann | ...................... | 709/220 |
| 7,668,174 B1 * | 2/2010 | Patel et al. | ................. | 370/395.3 |
| 7,836,182 B1 * | 11/2010 | Scano | ........................... | 709/226 |
| 8,015,271 B2 * | 9/2011 | McKeown et al. | ............ | 709/223 |
| 8,046,767 B2 * | 10/2011 | Rolia et al. | ..................... | 718/104 |
| 2010/0199188 A1 * | 8/2010 | Abu-Hakima et al. | ....... | 715/733 |

* cited by examiner

*Primary Examiner* — Asghar Bilgrami
(74) *Attorney, Agent, or Firm* — Anderson Gorecki & Rouille LLP

(57) ABSTRACT

Methods, apparatus and a computer program product provide for a Tolerant License Manager that defines a cluster of a plurality of network controllers, wherein each respective network controller contributes at least one license to a current total amount of licenses in a license pool. The Tolerant License Manager identifies at least one threatened access point upon detecting a first network controller has become unavailable. Each threatened access point comprises any access point connected to the first network controller when the first network controller becomes unavailable. The Tolerant License Manager establishes (and/or) approves a connection between a back-up controller and the threatened access point(s). While the first network controller is unavailable, the Tolerant License Manager allocates a license to each threatened access point via the back-up network controller.

18 Claims, 12 Drawing Sheets

TOLERANT DEVICE LICENSING IN A DISTRIBUTED ENVIRONMENT

CROSS REFERENCE TO RELATED APPLICATIONS

This U.S. Utility patent application claims the benefit of the filing date of an earlier filed U.S. Provisional Application for patent having U.S. Ser. No. 61/178,300, filed May 14, 2009 entitled "METHOD FOR TOLERANT DEVICE LICENSING IN A DISTRIBUTED ENVIRONMENT." The entire teaching, disclosure and contents of this provisional patent are hereby incorporated by reference herein in their entirety.

BACKGROUND

Wireless Local Area Networks (LANs) are a popular and inexpensive way to allow multiple users of "mobile units" (MUs) to communicate with each other, to access a wired LAN, to access a local server, to access a remote server, such as over the Internet, etc. A wireless local area network (WLAN) typically includes an Access Point (AP), Wireless Controller and one or more mobile units. Each mobile unit may be a device such as a notebook computer, personal digital assistant (PDA), wireless VoIP telephone or the like that transmits radio signals to and receives radio signals from other devices in the local area network via the AP. The mobile unit includes a wireless transceiver which can communicate with an access point. The communication can occur via radio waves, infrared, or any other known form of wireless communication. The access point allows wireless mobile units to communicate with each other and to communicate with infrastructure connected to the access point.

The server can provide services, such as access to applications like an email system, a word processing program, an accounting system and/or a dedicated database. Wireless LANs are employed within such facilities as businesses, university classrooms or buildings, airport lounges, hotel meeting rooms, etc. When a user is physically located in the vicinity of an access point, the transceiver of the mobile unit communicates with the access point and a connection to the wireless LAN is established.

APs and mobile units transmit data in units referred to as frames over a shared-communications channel. Frames transmitted from a mobile unit to an AP are referred to as uplink frames, and frames transmitted from an AP to a mobile unit are referred to as downlink frames. In a situation where two or more mobile units (or an AP and a mobile unit) transmit frames simultaneously, then one or more of the frames can become corrupted, referred to as a collision. As a result, Wireless Local Area Networks (WLANs) typically employ one or more protocols to ensure that a mobile unit or AP can gain exclusive access to the shared-communications channel for a predetermined interval of time in order to transmit its frames without collisions occurring.

Certain wireless network protocols (e.g., Institute of Electrical and Electronics Engineers [IEEE] 802.11, etc.) provide for the AP to periodically broadcast a special frame called a beacon that can be heard by the mobile units in the BSA (basic service area), the area covered by the AP. The beacon contains a variety of information that enables the mobile units to establish and maintain communications in an orderly fashion, such as a timestamp, which enables mobile units to synchronize their local clocks, and signaling information (e.g., channel number, frequency hopping pattern, dwell time, etc.).

BRIEF DESCRIPTION

In typical wireless LAN deployments, licenses are issued on a number of access points (APs) used by a customer. It is difficult to track AP licenses on a per AP basis since that would create a scaling problem with the licensing backend infrastructure and cause difficulty with regard to tracking the APs back to the customers across the channels. To avoid this, most vendors provide bulk licensing on the wireless controller for N number of APs. These licenses are bound to the MAC address of the wireless controller. So, for fail-over scenarios of wireless controllers, the customer is forced to buy extra licenses to support additional APs that may migrate from a failed wireless controller to other available wireless controllers. Additionally, in future wireless LAN deployments, there is likely to be more than just APs in the network consuming licenses—thereby increasing the scale of current bulk licensing schemes.

Techniques discussed herein significantly overcome the deficiencies of conventional network deployments such as those discussed above. As will be discussed further, certain specific embodiments herein are directed to a Tolerant License Manager which provides an approach that detects when a network controller becomes unavailable and establishes (i.e. approves) a connection between a back-up network controller and access points currently connected to the unavailable network controller.

The Tolerant License Manager maintains the licenses from the back-up controller for a specified amount of time (i.e. a grace period) to allow for the unavailable network controller to resume operation. However, if the unavailable network controller fails to resume operation during the grace period, licenses contributed by the unavailable network controller expire and the Tolerant License Manager distributes the current remaining amount of licenses amongst all currently connected access points—except those access points currently experiencing less than a certain amount of network traffic or some other selection criteria.

Specifically, in various embodiments, the Tolerant License Manager defines a cluster of a plurality of network controllers, wherein each respective network controller contributes at least one license to a current total amount of licenses in a license pool. The Tolerant License Manager identifies at least one threatened access point upon detecting a first network controller has become unavailable. Each threatened access point comprises any access point connected to the first network controller when the first network controller becomes unavailable. The Tolerant License Manager establishes (i.e. approves) a connection between a back-up controller and the threatened access point(s). While the first network controller is unavailable, the Tolerant License Manager allocates (i.e. distributes) a license to each threatened access point via the back-up network controller. It is understood that the Tolerant License Manager can be implemented via one or more network controllers within the cluster of network controllers.

For example, a cluster of network controllers has a plurality of wireless network controllers (WCs), whereby each WC operates with respect to the Tolerant License Manager. For example, the cluster can have two WCs, each WC having 256 licenses. The Tolerant License Manager contributes all the licenses to a license pool. The Tolerant License Manager keeps count that the current total amount of licenses is 512. For each access point connected to the cluster of WCs, the Tolerant License Manager allocates (i.e. distributes) a particular license for a given access point via a WC. Thus, the Tolerant License Manager tracks that 64 access points are connected to a first WC and are currently consuming 64 licenses. In addition, the Tolerant License Manager tracks that 64 access points are connected to a second WC and are currently consuming another 64 licenses as well.

Upon detecting the second WC is unavailable, the Tolerant License Manager collects the licenses contributed by the second WC and places those licenses in a grace pool of licenses for a specified amount of time (i.e. a "grace period"). Thus, the 256 licenses contributed by the second WC are placed in the grace pool of licenses ("grace pool"). It is noted that when the second WC becomes unavailable, those 64 access points currently connected to the second WC can be considered "threatened" access points.

The Tolerant License Manager approves an active (i.e. available, operational, live, etc.) WC in the cluster of WCs, such as the first WC, to act as a back-up network controller to which the threatened access points can fail-over. Thus, the back-up controller establishes a connection with each threatened access point.

During the grace period, while the second WC is still unavailable, the Tolerant License Manager determines the number of access points (128) is not greater than the current total amount of licenses (512). Since there are more licenses than access points, the Tolerant License Manager can allocate an unconsumed license to the threatened access points that failed-over to the back-up network controller (i.e. the first WC).

If the Tolerant License Manager detects that the second WC is still unavailable at the termination of the grace period, the 256 licenses in the grace pool expire. Upon expiration of the other 256 licenses contributed by the second WC, the current total amount of licenses in the license pool is now 256. The total number of access points connected to the back-up network controller remains at 128 since the 64 threatened access points continue being connected to the back-up network controller. Thus, there are still enough licenses (256) in the license pool the Tolerant License Manager can allocate to the 128 access points currently connected to the back-up network controller.

In another embodiment, upon expiration of the other 256 licenses contributed by the second WC due to the second WC failing to resume operation during the grace period, the Tolerant License Manager detects there are more access points than the amount of remaining licenses (256) in the license pool. Thus, the Tolerant License Manager returns (i.e. revokes) licenses that are already consumed by connected access points and those revoked licenses are once again available in the license pool. Further, the Tolerant License Manager identifies those access points with the least amount of network data and disables those "least loaded" access points. Each license consumed by a respective "least loaded" access point is now revoked and available in the license pool and the Tolerant License Manager can approve these licenses for other access points with respect to a particular WC. However, in one embodiment, once the licenses are revoked, they are lost and not placed back into the license pool—thereby decreasing the amount of licenses that can be distributed.

In yet another embodiment, if the Tolerant License Manager detects the second WC becomes operational prior to termination of the grace period, the Tolerant License Manager returns the 256 licenses in the grace pool back to the license pool and the Tolerant License Manager can thereby allocate unconsumed licenses from the license pool to any new access point with respect to any WC in the cluster. In addition, the first WC no longer acts as a back-up network controller for the second WC. Nonetheless, the threatened access points that failed-over to the back-up network controller may continue to be connected to the first WC (after it terminates acting as the back-up network controller).

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Avaya Incorporated of Basking Ridge, N.J., herein after referred to as "Avaya."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Tolerant License Manager, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Methods and apparatus provide for a Tolerant License Manager that defines a cluster of a plurality of network controllers, wherein each respective network controller contributes at least one license to a current total amount of licenses in a license pool. The Tolerant License Manager identifies at least one threatened access point upon detecting a first network controller has become unavailable. Each threatened access point comprises any access point connected to the first network controller when the first network controller becomes unavailable. The Tolerant License Manager establishes a connection between a back-up controller and the threatened access point(s). While the first network controller is unavailable, the Tolerant License Manager allocates a license to each threatened access point via the back-up network controller.

Figure 1:
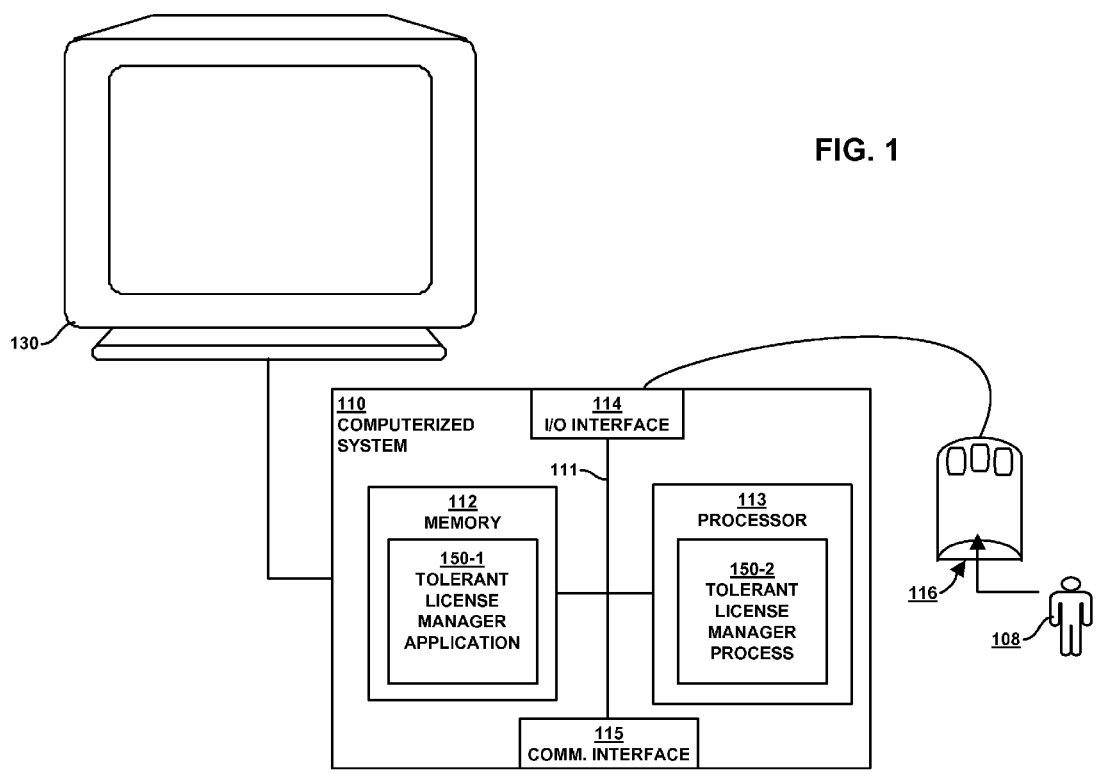
FIG. 1 is an example block diagram illustrating an architecture of a computer system that executes, runs, interprets, operates or otherwise performs a Tolerant License Manager application and/or Tolerant License Manager process according to embodiments herein.

FIG. 1 is an example block diagram illustrating an architecture of a computer system 110 that executes, runs, interprets, operates or otherwise performs a Tolerant License Manager application 150-1 and/or Tolerant License Manager process 150-2 (e.g. an executing version of a Tolerant License Manager 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Tolerant License Manager 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Tolerant License Manager application 150-1 and/or the Tolerant License Manager process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the Tolerant License Manager application 150-1. Execution of the Tolerant License Manager application 150-1 in this manner produces the Tolerant License Manager process 150-2. In other words, the Tolerant License Manager process 150-2 represents one or more portions or runtime instances of the Tolerant License Manager application 150-1 (or the entire application 150-1) performing or executing within or upon the processor 113 in the computerized device 110 at runtime.

The Tolerant License Manager application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Tolerant License Manager application 150-1 can be executed on a remotely accessible computerized device via the communication interface 115.

It is understood that, throughout this document, the Tolerant License Manager 150 can be interpreted (in various embodiments) as being implemented throughout a cluster of network controllers and/or from within any network controller(s) in a cluster of network controllers. In addition, any steps, events, methods or procedures described in this document can be interpreted (in various embodiments) as occurring via the Tolerant License Manager 150 with respect to one or more network controllers. It is also noted that aspects of the Tolerant License Manager 150 can be implemented with respect to any number of access points, network controllers and/or clusters of network controllers. In addition, multiple instances of the Tolerant License Manager 150 can be implemented sequentially, in parallel with each other or in any other logical pattern.

Figure 2:
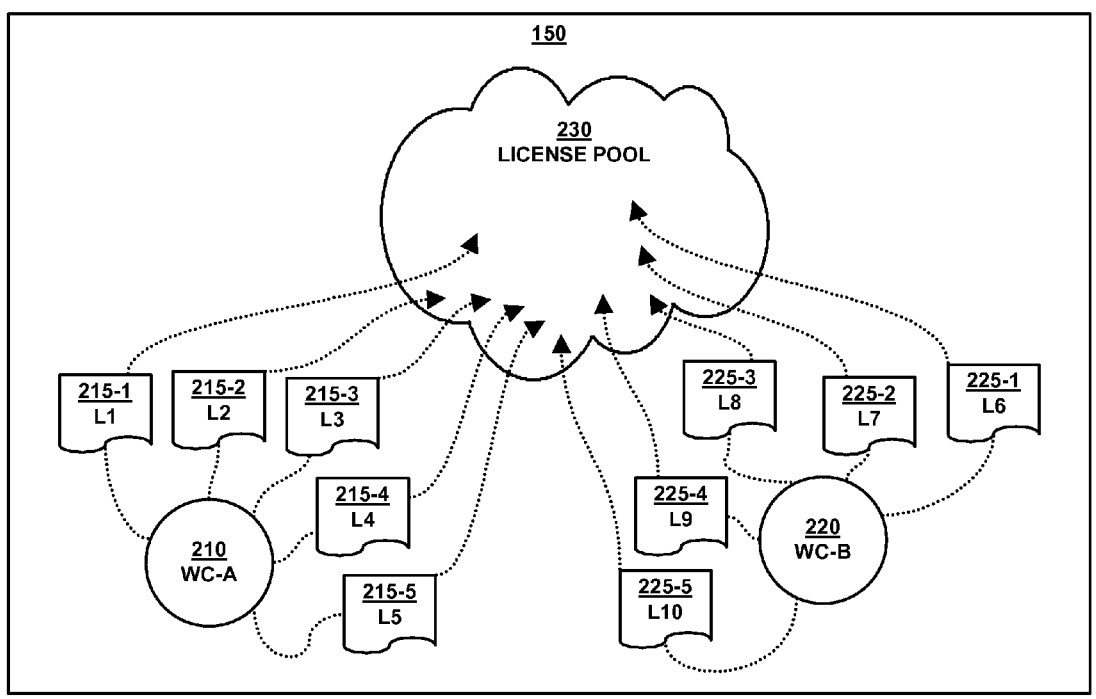
FIG. 2 is an example block diagram of network controllers, associated with the Tolerant License Manager, contributing respective licenses to a license pool according to embodiments herein.

FIG. 2 is an example block diagram of network controllers 210, 220, associated with the Tolerant License Manager 150, contributing respective licenses L1-L9 (215-1, 215-2, 215-3, 215-4, 215-4, 225-1, 225-2, 225-3, 225-4, 225-5, respectively) to a license pool 230 according to embodiments herein. Specifically, network controllers 210, 220 belong to a cluster of network controllers that can include any additional number of network controllers that also contribute respective licenses to the license pool 230.

It is understood that network controllers 210, 220 in the cluster can communicate with each other and each can individually track the current number of licenses (in the license pool 230) that can be allocated to a particular access point, as well as the number of licenses each network controller in the cluster has (i) contributed to the license pool 230 and (ii) allocated to various access points. Also, in some embodiments, each network controller 210, 220 allocates to access points only those licenses it has contributed to the license pool 230. In other embodiments, each network controller 210, 220 can allocate any license currently in the license pool 230—regardless of which network controller contributed the license.

Figure 3:
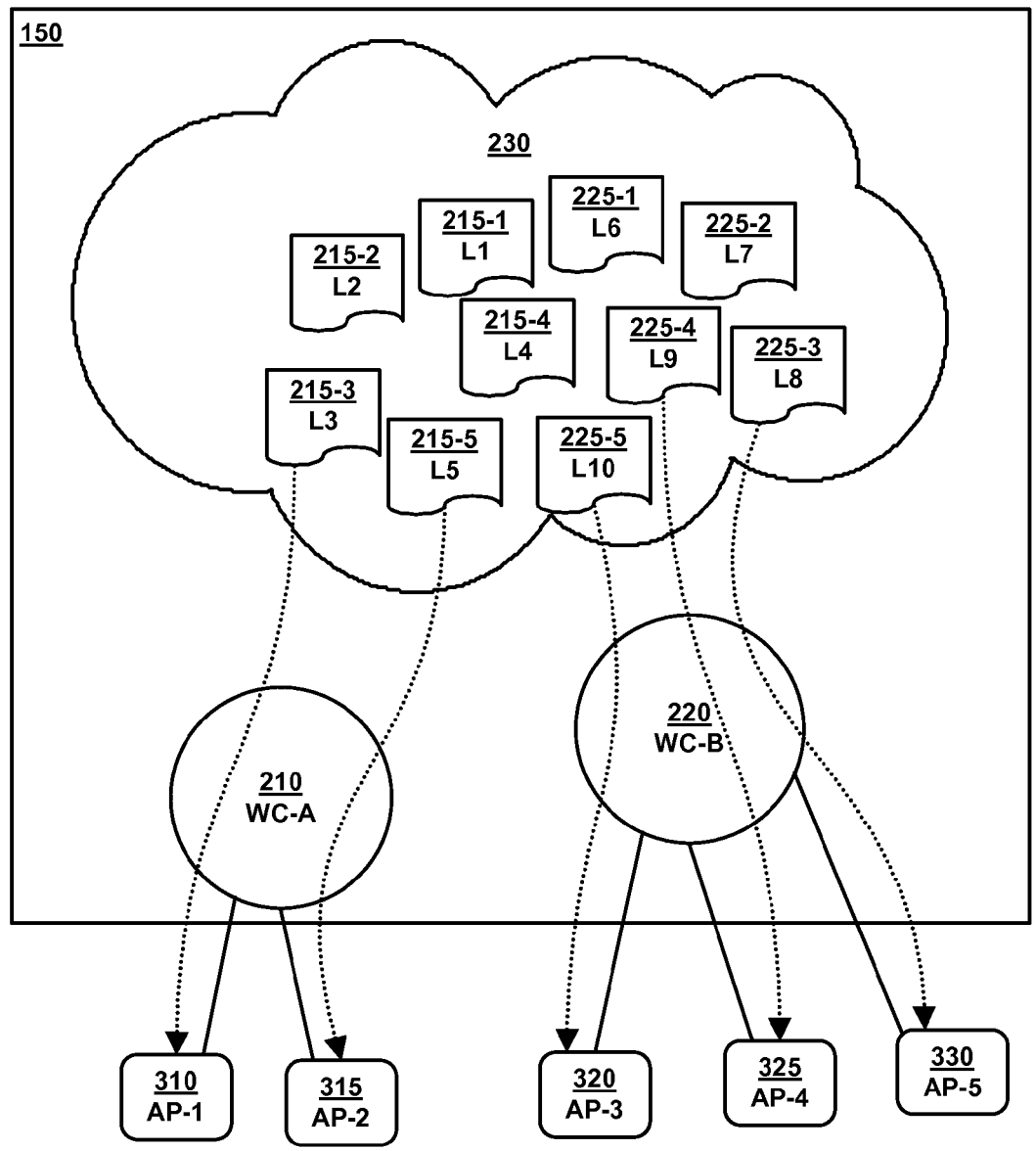
FIG. 3 is an example block diagram of network controllers, associated with the Tolerant License Manager, connected to various access points and allocating licenses to each respective access point according to embodiments herein.
Figure 4:
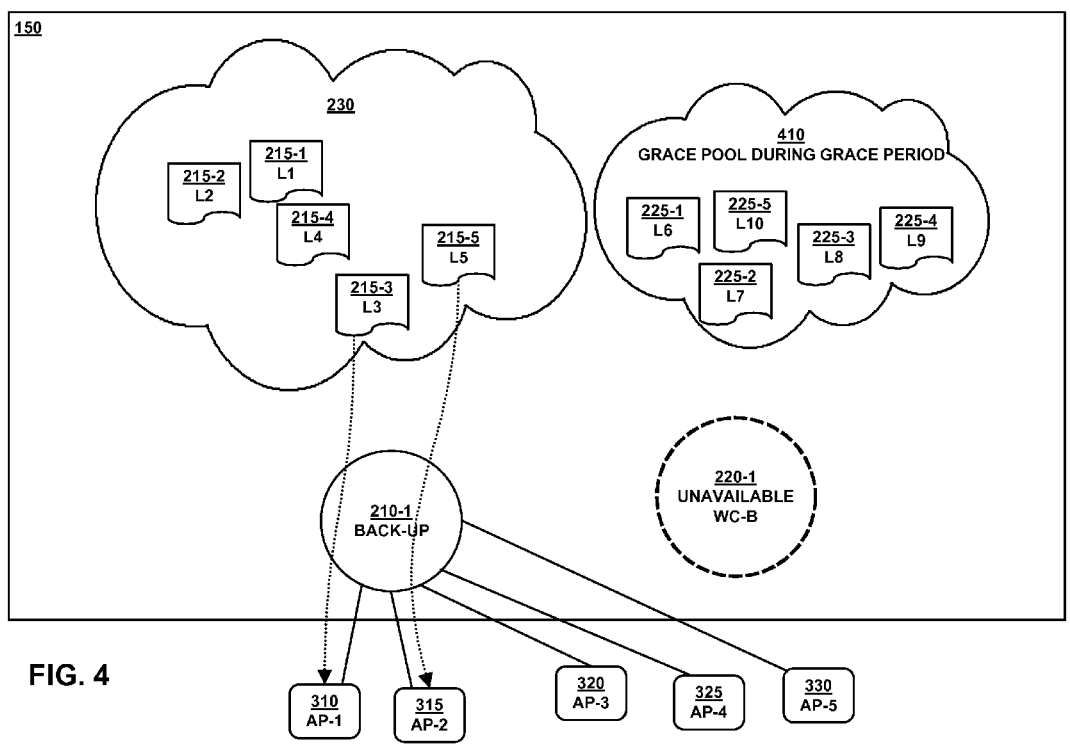
FIG. 4 is an example block diagram of a back-up network controller, associated with the Tolerant License Manager, establishing connections with various access points previously connected to a network controller that is unavailable according to embodiments herein.

FIG. 3 is an example block diagram of network controllers 210, 220, associated with the Tolerant License Manager 150, connected to various access points 310, 315, 320, 325, 330 and allocating licenses 215-3, 215-5, 225-3, 225-4, 225-5 to each respective access point 310, 315, 320, 325, 330 according to embodiments herein. As illustrated, a first wireless network controller (WC-A) 210 connects with a first access point (AP-1) 310 and a second access point (AP-2) 315. WC-A 210 allocates a license 215-3, 215-5 to AP-1 310 and AP-2 315, respectively. A second wireless network controller (WC-B) 220 connects with a third access point (AP-3) 320, a fourth access point (AP-4) 325 and a fifth access point (AP-5) 330. WC-B 220 allocates a license 225-3, 225-4, 225-5 to AP-3 320, AP-4 325 and AP-5 330, respectively FIG. 4 is an example block diagram of a back-up network controller 210-1, associated with the Tolerant License Manager 150, establishing connections with various access points previously connected to a network controller 220-1 that is unavailable according to embodiments herein. The Tolerant License Manager 150 (running with respect to any network controller(s) in the cluster) detects that WC-B 220-1 has become unavailable. For example, in one embodiment, the Tolerant License Manager 150 detects that WC-B 220-1 is associated with a failure event that disrupts communication between WC-B 210-1 and AP-3 320, AP-4 325 and AP-5 330. WC-B 220-1 thereby becomes unavailable due to the detected failure event.

Upon detecting that WC-B 220-1 is currently unavailable, the Tolerant License Manager 150 initiates a grace period (i.e. a specified amount of time) and places licenses 225-1, 225-2, 225-3, 225-3, 225-4, 225-5 contributed by WC-B 220 in a grace pool. The Tolerant License Manager 150 approves WC-A 210-1 to act as a back-up network controller for various processing performed by WC-B 220-1. For example, the back-up controller 210-1 establishes connections with those access points 320, 325, 330 (i.e. threatened access points) connected to WC-B 220-1 when WC-B 220-1 became unavailable.

Figure 5:
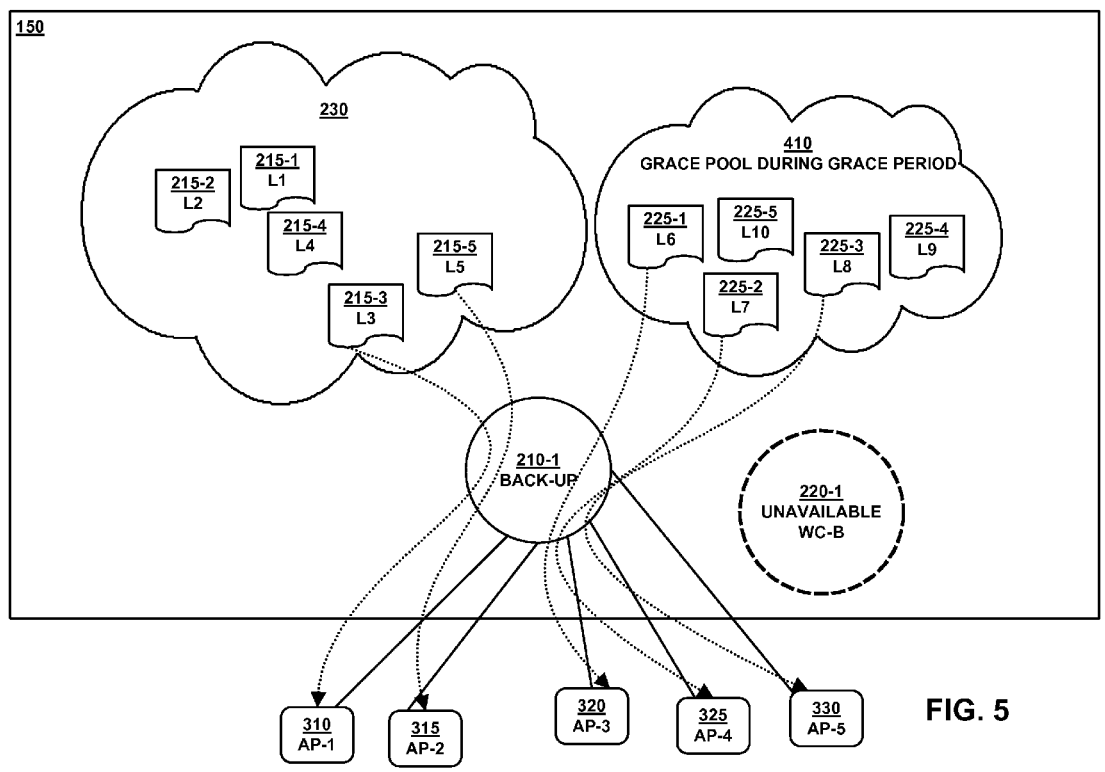
FIG. 5 is an example block diagram of a back-up network controller, associated with the Tolerant License Manager, allocating licenses from a grace pool to access points previously connected to a network controller that is unavailable according to embodiments herein.

FIG. 5 is an example block diagram of a back-up network controller 210-1, associated with the Tolerant License Manager 150, allocating licenses 225-1, 225-2, 225-3 from a grace pool 410 to access points 320, 325, 330 previously connected to a network controller 220-1 that is currently unavailable according to embodiments herein.

During the grace period, and while WC-B 220-1 continues to be unavailable, the Tolerant License Manager 150 detects the current number of access points 310, 315, 320, 325, 330 is not more than the current number of licenses L1-L9 (215-1, L2 215-2, 215-3, 215-4, 215-4, 225-1, 225-2, 225-3, 225-4, 225-5, respectively), the back-up controller 210-1 allocates licenses 225-1, 225-2, 225-3, from the grace pool 410, to each respective threatened access point 320, 325, 330.

Figure 6:
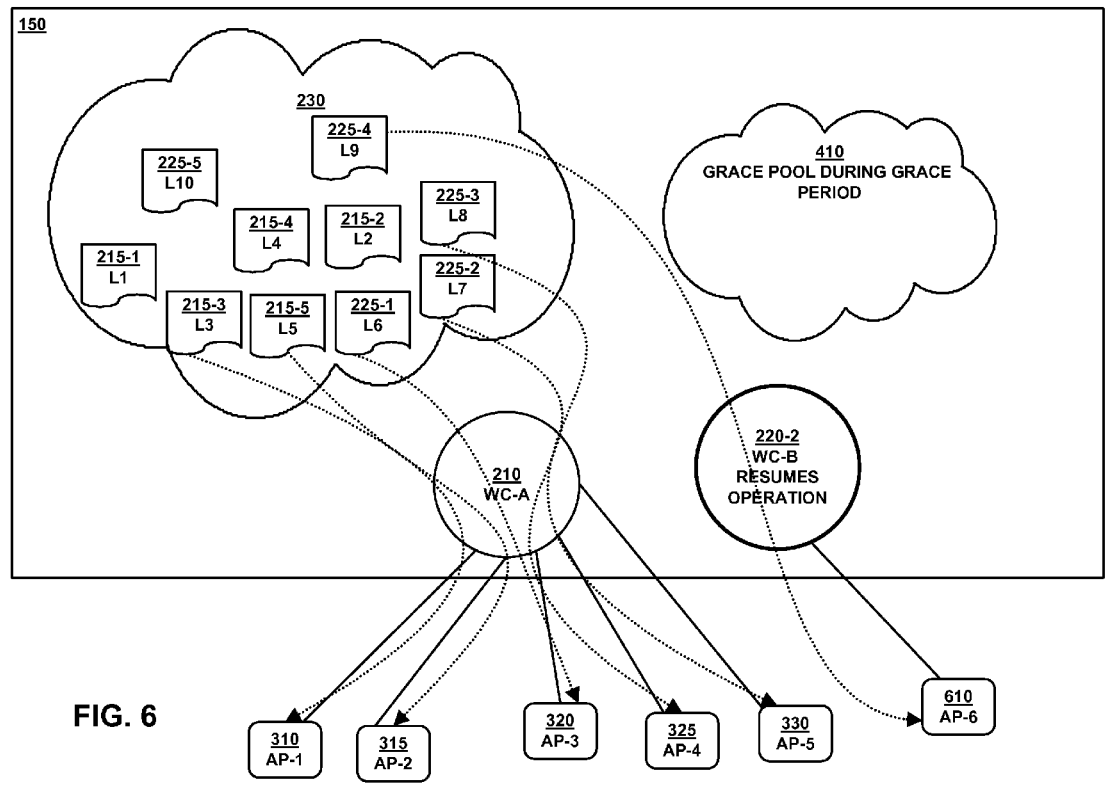
FIG. 6 is an example block diagram of a network controller, associated with the Tolerant License Manager, resuming operation during a grace period according to embodiments herein.

FIG. 6 is an example block diagram of a network controller 220-2, associated with the Tolerant License Manager 150, resuming operation during a grace period according to embodiments herein. For example, if the Tolerant License Manager 150 detects WC-B 220-2 becomes operational prior to termination of the grace period, the Tolerant License Manager 150 returns those licenses contributed by WC-B from the grace pool 410 back to the license pool 230. In addition, WC-A no longer acts as a back-up network controller for WC-B 220-1. Nonetheless, the threatened access points 320, 325, 330 continue to be connected to WC-A 210 after it terminates acting as the back-up network controller 210-1. Upon receipt of a request to connect to the cluster from an access point (AP-6) 510, the Tolerant License Manager 150 allocates a license (L9) 225-4 to be consumed by AP-6 510 via now operational WC-B 220-2.

Figure 7:
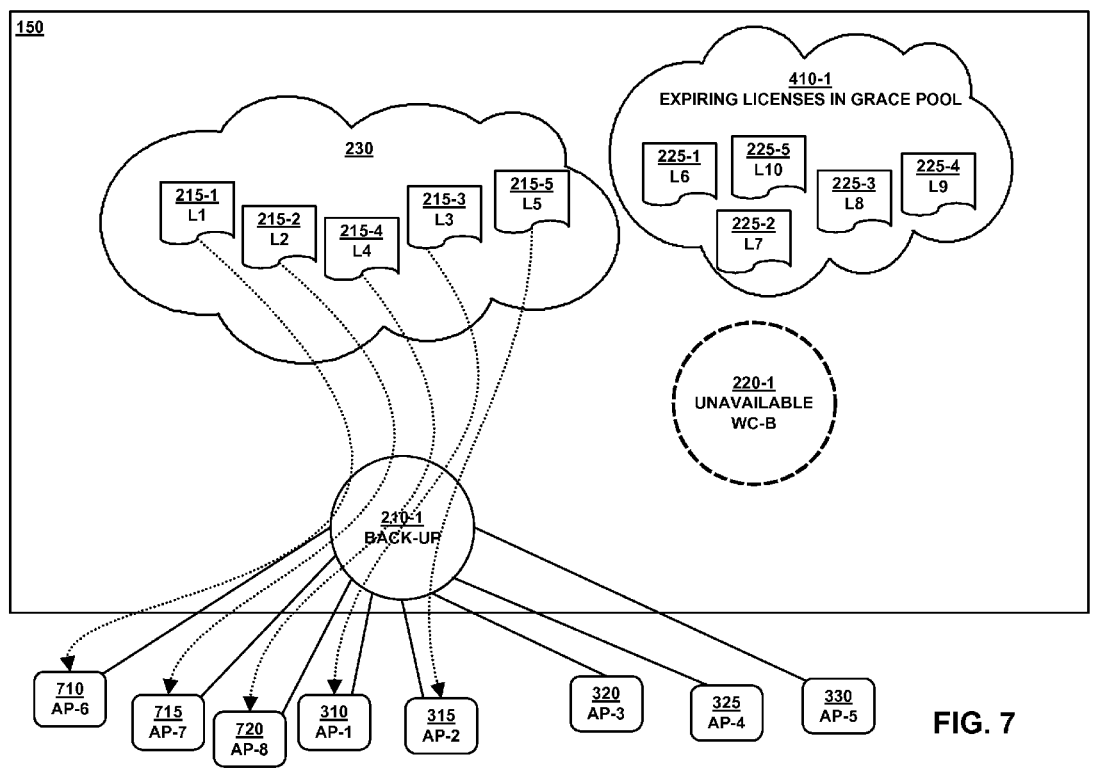
FIG. 7 is an example block diagram of licenses in a grace pool expiring at the end of a grace period according to embodiments herein.

FIG. 7 is an example block diagram of licenses in a grace pool 410-1 expiring at the end of a grace period according to embodiments herein. Continuing from aspects illustrated in FIG. 5, in one embodiment, the Tolerant License Manager 150 has allocated all the licenses 215-1, 215-2, 215-3, 215-4, 215-5 in the license pool 230 to respective access points, 310, 315, 710, 715, 720. In addition, the grace period terminates while the WC-B 220-1 is still unavailable. Thus, there are currently more access points than there are licenses—but all the licenses are currently consumed.

Figure 8:
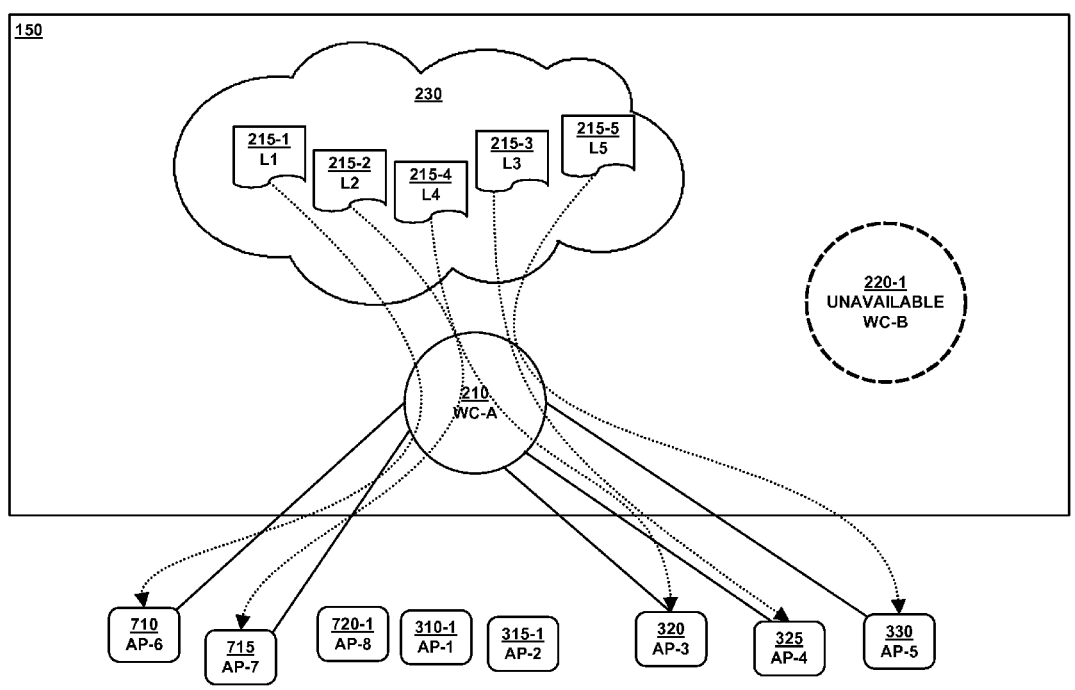
FIG. 8 is an example block diagram of a network controller, associated with the Tolerant License Manager, disabling connections with various access points according to embodiments herein.

FIG. 8 is an example block diagram of a network controller 210-1, associated with the Tolerant License Manager 150, disabling connections with various access points according to embodiments herein. Continuing from aspects illustrated in FIG. 7, the Tolerant License Manager 150 detects that the grace period has terminated and WC-B 220-1 is still unavailable. Licenses contributed by WC-B 220-1 have expired and licenses 215-1, 215-2, 215-3, 215-4, 215-5 contributed by WC-A 210 remain in the license pool 230. The Tolerant License Manager 150 detects there are more access points 310-1, 315-1, 320, 325, 330, 710-1, 715, 720-1 than licenses 215-1, 215-2, 215-3, 215-4, 215-5. The Tolerant License Manager 150 identifies access points 310-1, 315-1, 720-1 experiencing the least amount of network traffic and disables their respective connections. Upon disabling the "least loaded" access points access points 310-1, 315-1, 720-1, the Tolerant License Manager 150 detects there is a suitable amount of licenses with the respect to the connected access points 320, 325, 330, 710, 715—and the Tolerant License Manager 150 allocates (i.e. distributes) the licenses 215-1, 215-2, 215-3, 215-4, 215-5 to the connected access points 320, 325, 330, 710, 715 via WC-A 210.

FIG. 9 through FIG. 12 illustrate various embodiments of the Tolerant License Manager 150. The rectangular elements in flowcharts 900, 1000, 1100, 1200 denote "processing blocks" and represent computer software instructions or groups of instructions upon a computer readable medium.

Additionally, the processing blocks represent steps performed by hardware such as a computer, digital signal processor circuit, application specific integrated circuit (ASIC), etc.

Flowcharts 900, 1000, 1100, 1200 do not necessarily depict the syntax of any particular programming language. Rather, flowcharts 900, 1000, 1100, 1200 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 9:
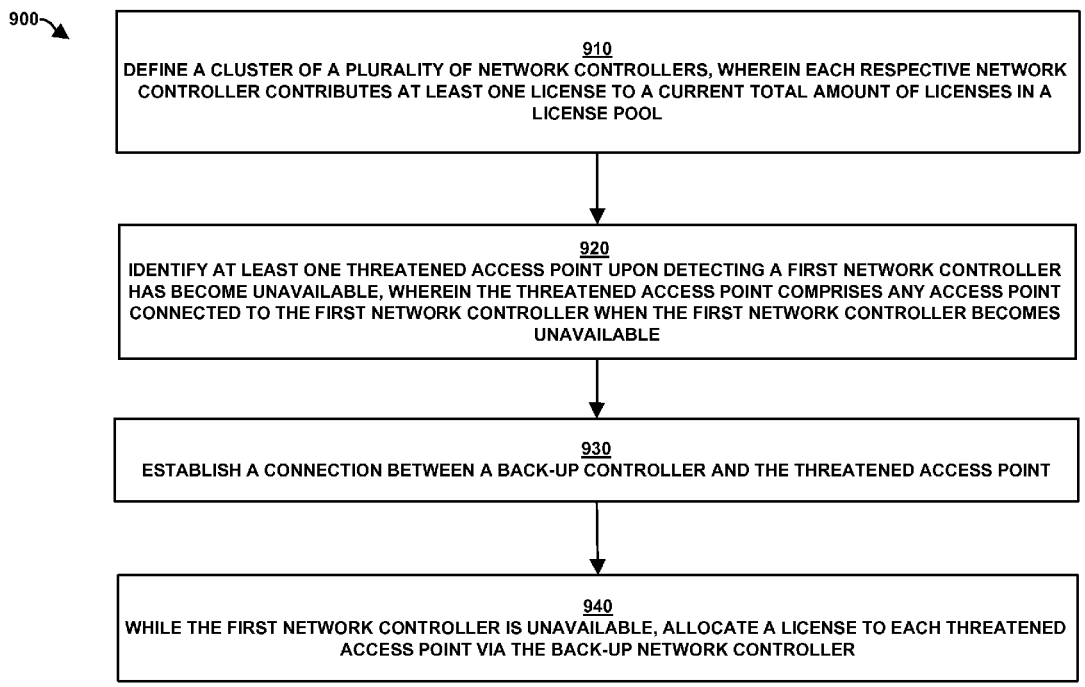
FIG. 9 is a flowchart of an example of processing steps performed by the Tolerant License Manager to allocating a license to each threatened access point according to embodiments herein.

FIG. 9 is a flowchart 900 of an example of processing steps performed by the Tolerant License Manager (TLM) 150 to allocating a license to each threatened access point according to embodiments herein.

At step 910, the TLM 150 defines a cluster of a plurality of network controllers, wherein each respective network controller contributes at least one license to a current total amount of licenses in a license pool.

At step 920, the TLM 150 identifies at least one threatened access point upon detecting a first network controller has become unavailable, wherein the threatened access point comprises any access point connected to the first network controller when the first network controller becomes unavailable. Upon detecting the first network controller is unavailable, the TLM 150 places each license contributed by the first network controller into a grace pool for a grace period (i.e. a specified amount of time). It is understood that a current total amount of licenses accounts for each license currently in the grace pool.

In one embodiment, a network controller can become unavailable when it is administratively removed from the cluster. Thus, those licenses contributed by the administratively removed network controller are lost as well immediately. In addition, any license can be added or deleted by an administrative function of the TLM 150—where such license addition and license deletion can be accounted for in any of the embodiments discussed herein.

At step 930, the TLM 150 establishes (i.e. approves) a connection between a back-up controller and the threatened access point.

At step 940, while the first network controller is unavailable, the TLM 150 allocates a license to each threatened access point via the back-up network controller.

In one embodiment, during the grace period, the TLM 150 allocates an unconsumed license to each threatened access point when the total number of access points is not greater than the current total amount of licenses. It is noted that the total number of access points includes each threatened access point and any other access point connected to the cluster. For example, with regard to a plurality of threatened access points, the TLM 150 allocates (i) a first license from the grace pool to a first threatened access point via the back-up controller and (ii) a second license from the grace pool to a second threatened access point via the back-up controller.

Figure 10:
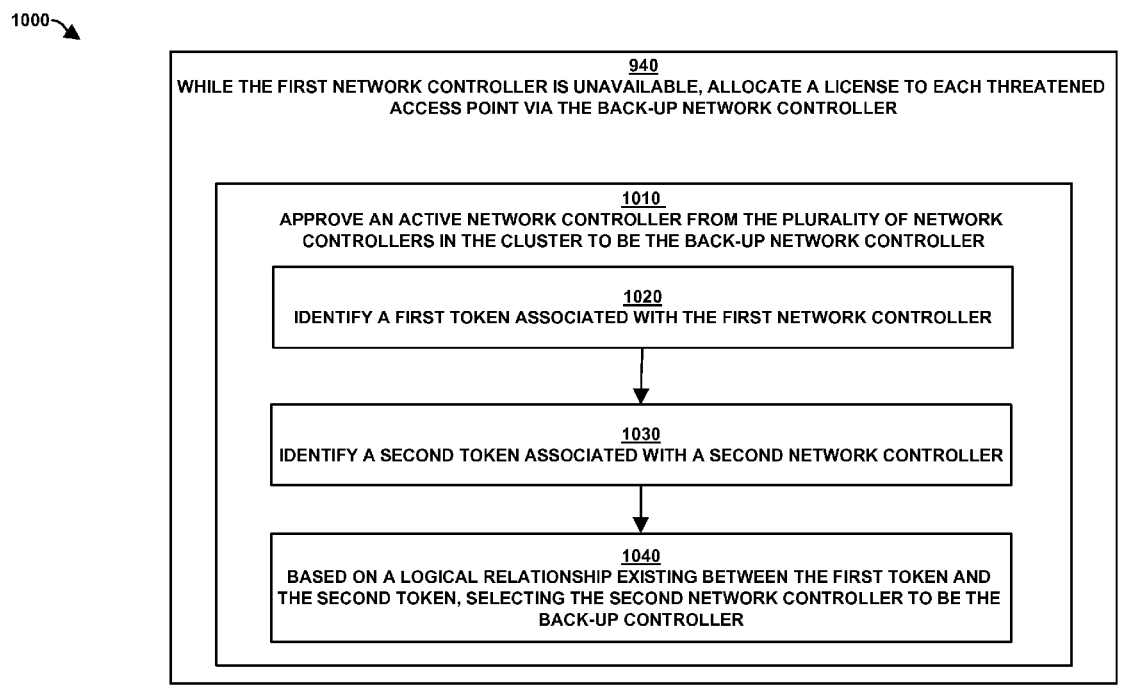
FIG. 10 is a flowchart of an example of processing steps performed by the Tolerant License Manager to approve a network controller to be a back-up controller according to embodiments herein.

FIG. 10 is a flowchart 1000 of an example of processing steps performed by the Tolerant License Manager 150 approves a network controller to be a back-up controller according to embodiments herein.

At step 1010, the TLM 150 approves an active network controller from the plurality of network controllers in the cluster to be the back-up network controller.

At step 1020, the TLM 150 identifies a first token associated with the first network controller.

At step 1030, the TLM 150 identifies a second token associated with a second network controller.

At step 1040, based on a logical relationship existing between the first token and the second token, the TLM 150 selects the second network controller to be the back-up controller.

Figure 11:
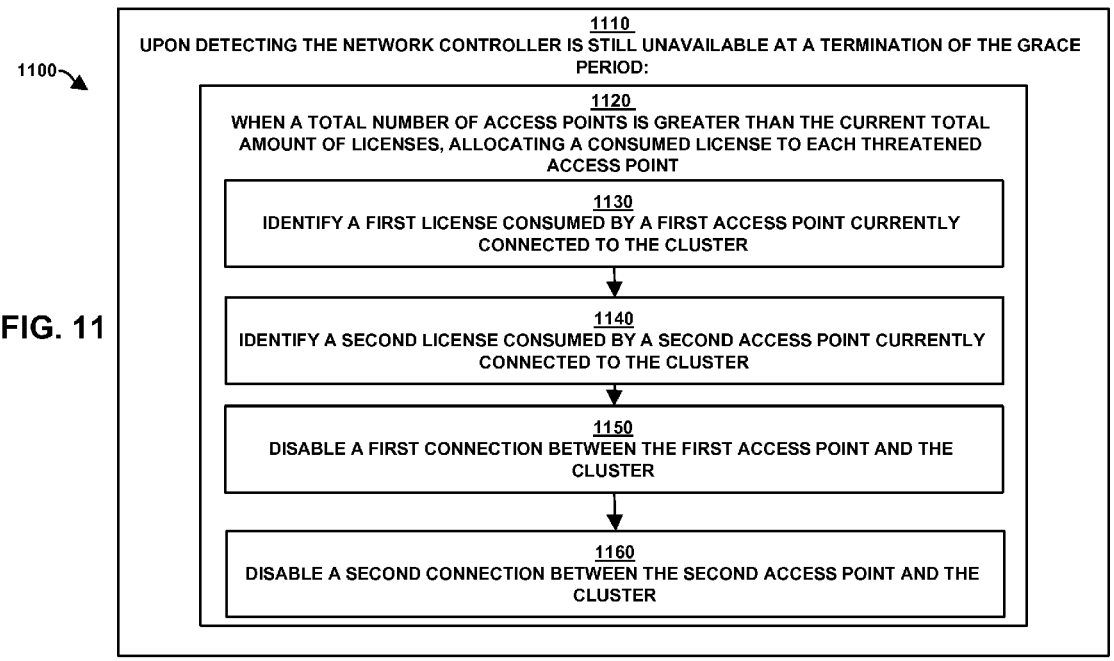
FIG. 11 is a flowchart of an example of processing steps performed by the Tolerant License Manager to disable connections to respective access points according to embodiments herein.

FIG. 11 is a flowchart 1100 of an example of processing steps performed by the Tolerant License Manager 150 to disable connections to respective access points according to embodiments herein.

At steps 1110-1120, when a total number of access points is greater than the current total amount of licenses, the TLM 150 allocates a consumed license to each threatened access point.

At step 1130, the TLM 150 identifies a first license consumed by a first access point currently connected to the cluster. For example, the TLM 150 identifies the first license based at least on network traffic currently experienced by the first access point.

At step 1140, the TLM 150 identifies a second license consumed by a second access point currently connected to the cluster. For example, the TLM 150 identifies the second license based at least on network traffic currently experienced by the second access point.

At step 1150, the TLM 150 disables a first connection between the first access point and the cluster.

At step 1160, the TLM 150 disables a second connection between the second access point and the cluster.

Figure 12:
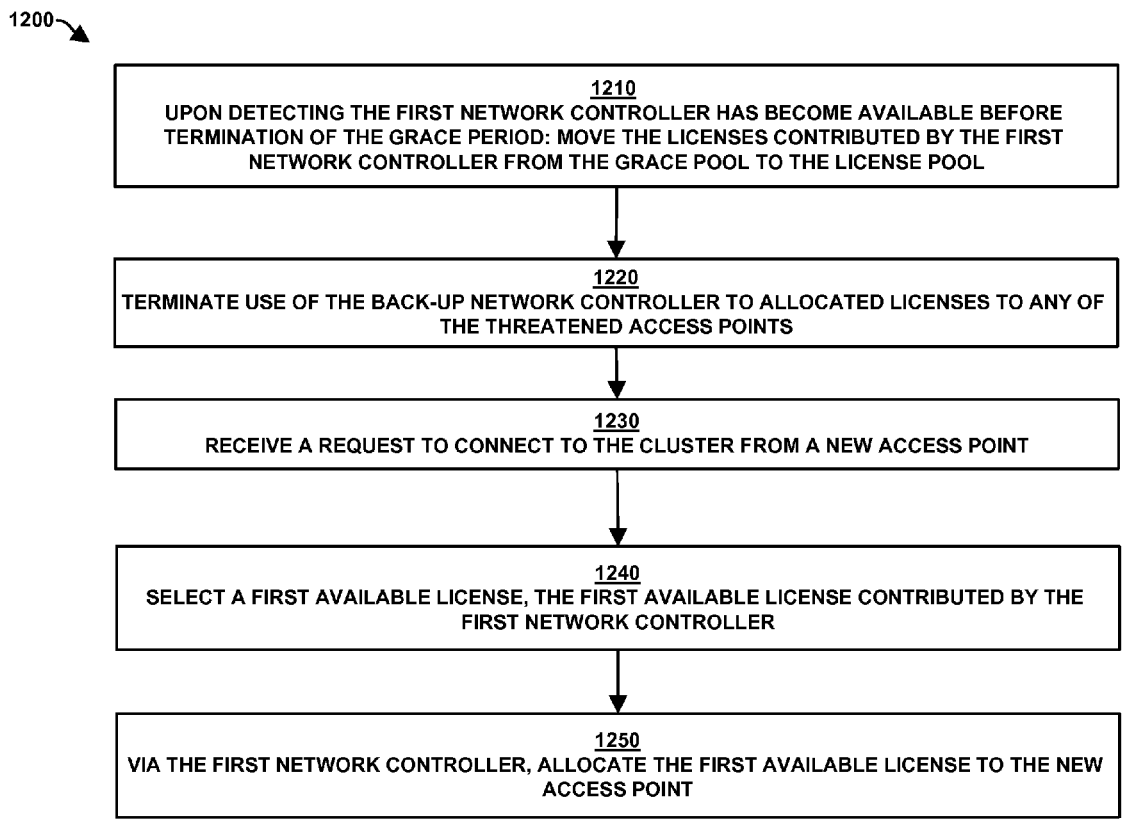
FIG. 12 is a flowchart of an example of processing steps performed by the Tolerant License Manager to allocate a license to a new access point according to embodiments herein.

FIG. 12 is a flowchart 1200 of an example of processing steps performed by the Tolerant License Manager 150 to allocate a license to a new access point according to embodiments herein.

At step 1210, upon detecting the first network controller has become available before termination of the grace period, the TLM 150 moves the licenses contributed by the first network controller from the grace pool to the license pool.

At step 1220, the TLM 150 terminates use of the back-up network controller to allocate (i.e. distribute, assign) licenses to any of the threatened access points.

At step 1230, the TLM 150 receives a request to connect to the cluster from a new access point. For example, in one embodiment, the request will be sent from a network controller—which itself accepts a join request received from the new access point.

At step 1240, the TLM 150 selects a first available license, the first available license contributed by the first network controller.

At step 1250, via the first network controller, the TLM 150 allocates the first available license to the new access point.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
defining a cluster of a plurality of network controllers, wherein each respective network controller contributes at least one license to a current total amount of licenses in a license pool;
identifying at least one threatened access point upon detecting a first network controller has become unavailable, wherein the threatened access point comprises any access point connected to the first network controller when the first network controller becomes unavailable;
establishing a connection between a back-up controller and the threatened access point;
while the first network controller is unavailable, allocating a license to each threatened access point via the back-up network controller;
upon detecting the first network controller is unavailable, placing each license contributed by the first network controller into a grace pool for a grace period, wherein the current total amount of licenses accounts for each license currently in the grace pool, the grace period comprising a specified time interval; and
wherein allocating a license to each threatened access point via the back-up network controller while the first network controller is in a failed state includes:
during the grace period, allocating an unconsumed license to each threatened access point when a total number of access points is not greater than the current total amount of licenses, the total number of access points including each threatened access point and another access point connected to the cluster.

2. The method as in claim 1, wherein allocating an unconsumed license includes:
allocating a first license from the grace pool to a first threatened access point via the back-up controller; and
allocating a second license from the grace pool to a second threatened access point via the back-up controller.

3. The method as in claim 1, wherein allocating a license to each threatened access point via the back-up network controller while the first network controller is unavailable includes:
upon detecting the network controller is still unavailable at a termination of the grace period:
when a total number of access points is greater than the current total amount of licenses, allocating a consumed license to each threatened access point.

4. The method as in claim 3, wherein allocating a consumed license includes:

identifying a first license consumed by a first access point currently connected to the cluster;

identifying a second license consumed by a second access point currently connected to the cluster;

disabling a first connection between the first access point and the cluster; and disabling a second connection between the second access point and the cluster.

5. The method as in claim 4, wherein identifying the first access point and the second access point according to the at least one attribute includes:

identifying the first license based at least on network traffic currently experienced by the first access point; and identifying the second license based at least on network traffic currently experienced by the second access point.

6. The method as in claim 1, comprising:

upon detecting the first network controller has become available before termination of the grace period:

moving the licenses contributed by the first network controller from the grace pool to the license pool; and terminating use of the back-up network controller to allocate licenses to any of the threatened access points.

7. The method as in claim 6, comprising:

receiving a request to connect to the cluster from a new access point;

selecting a first available license, the first available license contributed by the first network controller; and via the first network controller, allocating the first available license to the new access point.

8. The method as in claim 1, wherein allocating a license to each threatened access point includes:

approving an active network controller from the plurality of network controllers in the cluster to be the back-up network controller.

9. The method as in claim 8, wherein approving an active network controller from the plurality of network controllers in the cluster to be the back-up network controller includes:

identifying a first token associated with the first network controller;

identifying a second token associated with a second network controller; and based on a logical relationship existing between the first token and the second token, selecting the second network controller to be the back-up controller.

10. A computer readable medium comprising executable instructions encoded thereon operable on a computerized device to perform processing comprising:

instructions for defining a cluster of a plurality of network controllers, wherein each respective network controller contributes at least one license to a current total amount of licenses in a license pool;

instructions for identifying at least one threatened access point upon detecting a first network controller has become unavailable, wherein the threatened access point comprises any access point connected to the first network controller when the first network controller becomes unavailable;

instructions for establishing a connection between a back-up controller and the threatened access point;

instructions for allocating a license, while the first network controller is unavailable, to each threatened access point via the back-up network controller;

instructions for placing each license contributed by the first network controller into a grace pool for a grace period upon detecting the first network controller is unavailable, wherein the current total amount of licenses accounts for each license currently in the grace pool, the grace period comprising a specified time interval; and wherein the instructions for allocating a license to each threatened access point via the back-up network controller while the first network controller is in a failed state include:

instructions for allocating an unconsumed license, during the grace period, to each threatened access point when a total number of access points is not greater than the current total amount of licenses, the total number of access points including each threatened access point and any other access point connected to the cluster.

11. The computer readable medium as in claim 10, wherein the instructions for allocating an unconsumed license include:

instructions for allocating a first license from the grace pool to a first threatened access point via the back-up controller; and instructions for allocating a second license from the grace pool to a second threatened access point via the back-up controller.

12. The computer readable medium as in claim 10, wherein the instructions for allocating a license to each threatened access point via the back-up network controller while the first network controller is unavailable includes:

instructions for detecting the network controller is still unavailable at a termination of the grace period:

instructions for allocating a consumed license, upon detecting the network controller is still unavailable, to each threatened access point when a total number of access points is greater than the current total amount of licenses.

13. The computer readable medium as in claim 12, wherein the instructions for allocating a consumed license include:

instructions for identifying a first license consumed by a first access point currently connected to the cluster;

instructions for identifying a second license consumed by a second access point currently connected to the cluster;

instructions for disabling a first connection between the first access point and the cluster; and instructions for disabling a second connection between the second access point and the cluster.

14. The computer readable medium as in claim 13, wherein the instructions for identifying the first access point and the second access point according to the at least one attribute include:

instructions for identifying the first license based at least on network traffic currently experienced by the first access point; and instructions for identifying the second license based at least on network traffic currently experienced by the second access point.

15. The computer readable medium as in claim 10, comprising:

instructions for moving the licenses contributed by the first network controller, detecting the first network controller has become available before termination of the grace period, from the grace pool to the license pool; and instructions for terminating use of the back-up network controller to allocated licenses to any of the threatened access points.

16. The computer readable medium as in claim 15, comprising:

instructions for receiving a request to connect to the cluster from a new access point;

instructions for selecting a first available license, the first available license contributed by the first network controller; and instructions for allocating the first available license, via the first network controller, to the new access point.

17. The computer readable medium as in claim 10, wherein the instructions for allocating a license to each threatened access point includes:
   instructions for identifying a first token associated with the first network controller;
   instructions for identifying a second token associated with a second network controller; and
   instructions for selecting the second network controller to be the back-up controller based on a logical relationship existing between the first token and the second token.

18. A wireless network controller comprising:
   a processor;
   a memory unit that stores instructions associated with an application executed by the processor; and
   an interconnect coupling the processor and the memory unit, enabling the computer system to execute the application and perform operations of:
   defining a cluster of a plurality of network controllers, wherein each respective network controller contributes at least one license to a current total amount of licenses in a license pool;
   identifying at least one threatened access point upon detecting a first network controller has become unavailable, wherein the threatened access point comprises any access point connected to the first network controller when the first network controller becomes unavailable;
   approving a connection between a back-up controller and the threatened access point;
   while the first network controller is unavailable, allocating a license to each threatened access point via the back-up network controller;
   upon detecting the first network controller is unavailable, placing each license contributed by the first network controller into a grace pool for a grace period, wherein the current total amount of licenses accounts for each license currently in the grace pool, the grace period comprising a specified time interval; and
   wherein allocating a license to each threatened access point via the back-up network controller while the first network controller is in a failed state includes:
   during the grace period, allocating an unconsumed license to each threatened access point when a total number of access points is not greater than the current total amount of licenses, the total number of access points including each threatened access point and any other access point connected to the cluster.

* * * * *